United States Patent

Bellamy et al.

Patent Number: 5,947,226
Date of Patent: Sep. 7, 1999

[54] MOTOR VEHICLE INCLUDING A POWER UNIT PROVIDED WITH A SUSPENSION OF LIMITED DISPLACEMENT

[75] Inventors: Alain Bellamy, Naveil; Pascal Thierry, Villiers sur Loir, both of France

[73] Assignee: Hutchinson, Paris, France

[21] Appl. No.: 08/966,933

[22] Filed: Nov. 10, 1997

[30] Foreign Application Priority Data

Nov. 12, 1996 [FR] France ................... 96 13739

[51] Int. Cl.$^6$ .................................. B60K 1/00
[52] U.S. Cl. ..................... 180/299; 180/902; 180/300; 248/634; 267/140.11
[58] Field of Search ..................... 180/300, 299, 180/11, 902, 312, 292, 293; 267/140.11, 140.13, 140.14; 248/638, 634

[56] References Cited

U.S. PATENT DOCUMENTS

| | | | |
|---|---|---|---|
| 4,056,249 | 11/1977 | Hashimoto | 248/9 |
| 4,641,809 | 2/1987 | Beer | 248/559 |
| 4,884,779 | 12/1989 | Drabing et al. | 248/610 |
| 4,896,797 | 1/1990 | Le Fol et al. | 267/140.1 |
| 5,145,156 | 9/1992 | Muramatsu et al. | 267/140.14 |
| 5,364,061 | 8/1993 | Ciolczyk et al. | 248/610 |

FOREIGN PATENT DOCUMENTS

| | | |
|---|---|---|
| 0 142 943 | 5/1985 | European Pat. Off. . |
| 0 315 805 A1 | 5/1989 | European Pat. Off. . |
| 2 317 121 | 4/1977 | France . |
| 87 14 888 | 3/1988 | Germany . |

OTHER PUBLICATIONS

French Search Report dated Jul. 15,1997, French Application FR 9613739.

*Primary Examiner*—J. J. Swann
*Assistant Examiner*—James S McClellan
*Attorney, Agent, or Firm*—Marshall, O'Toole, Gerstein, Murray & Borun

[57] ABSTRACT

A motor vehicle has its power unit connected to its vehicle structure via a suspension provided with at least one mount which comprises a rigid support arm secured to the power unit, an antivibration support including an elastomer body which supports the power unit while allowing displacements of the power unit at least parallel to a vertical first axis and parallel to a horizontal second axis, and a displacement limiter acting parallel to the second axis. The displacement limiter comprises three rigid fingers perpendicular to the second axis, together with two limiter rings of elastomer reinforced with strong thread, each ring surrounding two of the three fingers, specifically a finger secured to the support arm and a finger secured to the vehicle structure.

10 Claims, 4 Drawing Sheets

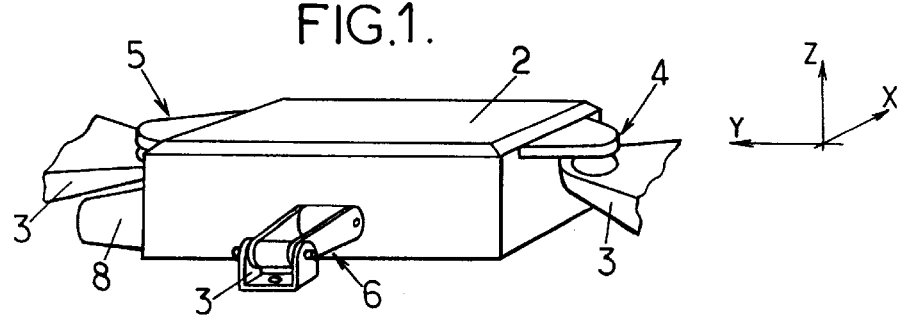
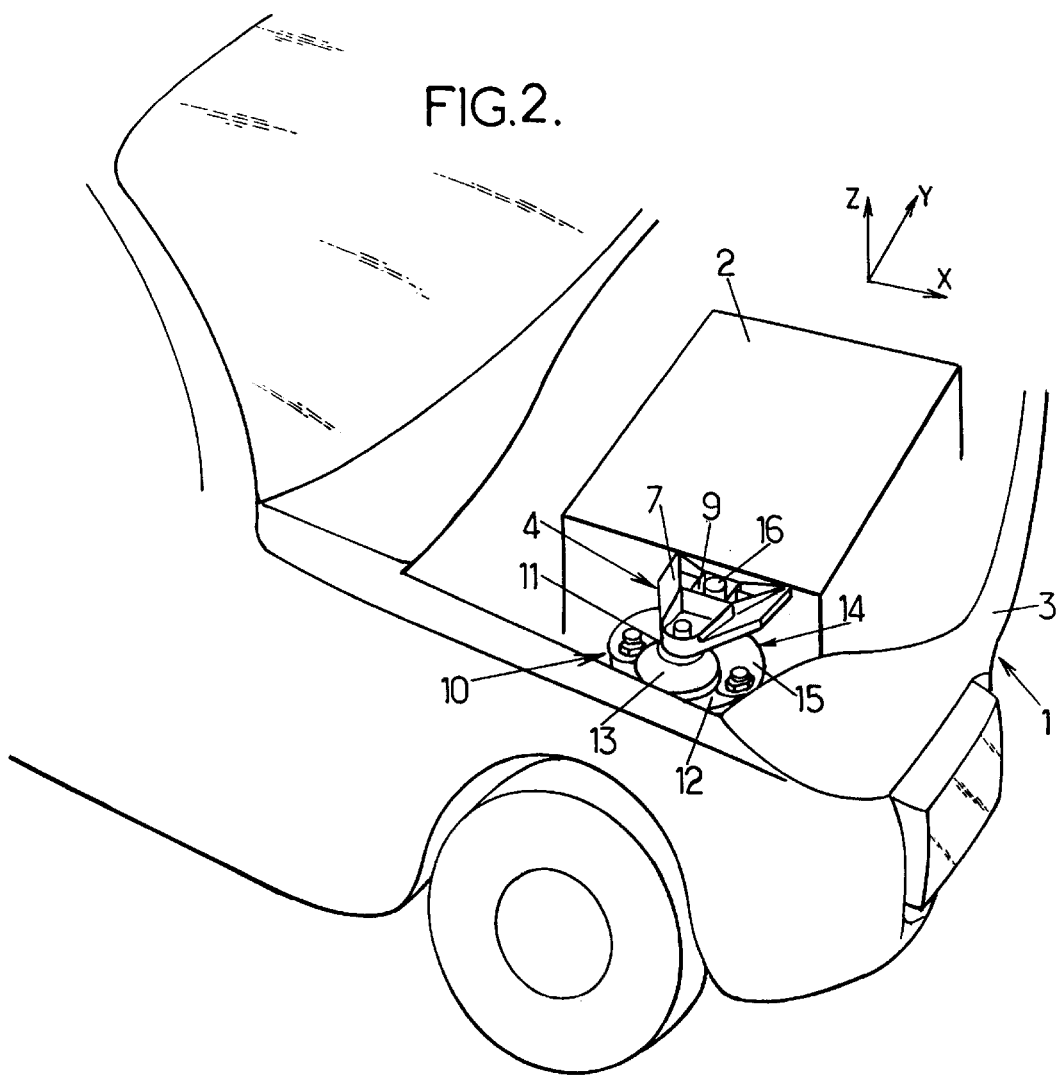

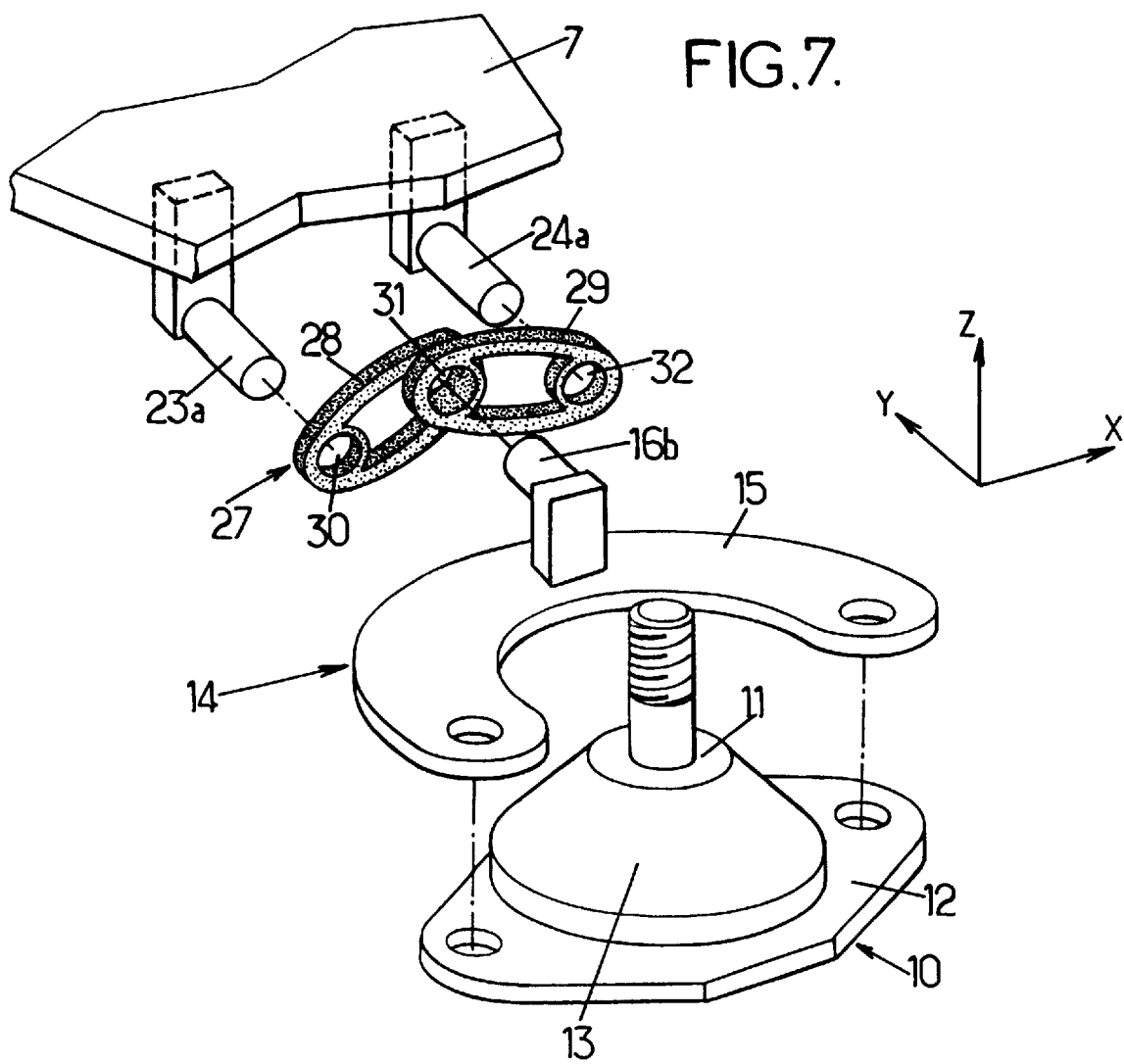

MOTOR VEHICLE INCLUDING A POWER UNIT PROVIDED WITH A SUSPENSION OF LIMITED DISPLACEMENT

FIELD OF THE INVENTION

The present invention relates to a motor vehicle including a power unit provided with a suspension of limited displacement.

More particularly, the invention relates to a motor vehicle comprising a vehicle structure, a power unit, and a plurality of mounts supporting the power unit and damping relative vibratory motion between the power unit and the vehicle structure parallel to a substantially vertical first axis, said mounts allowing displacements of the power unit relative to the vehicle structure parallel to the first axis and at least parallel to a second axis perpendicular to the first axis, at least one of said mounts, referred to as the "first mount" comprising:

- a rigid support arm secured to the power unit, one of the support arm and the vehicle structure being referred to below as the "first element" and the other being referred to as the "second element";
- an antivibration support itself comprising a first rigid strength member fixed to the support arm, a second rigid strength member fixed to the vehicle structure, and an elastomer body interconnecting the first and second strength members and supporting the power unit while allowing the above-mentioned relative displacements to take place between the power unit and the vehicle structure; and
- a displacement limiter suitable for limiting relative displacements between the power unit and the vehicle structure parallel to the second axis, the displacement limiter comprising a rigid first finger which extends along a direction perpendicular to the second axis and which is secured to the first element.

BACKGROUND OF THE INVENTION

In known vehicles of this type, for example the "CLIO" marque vehicle manufactured by RENAULT, the first finger is covered by a mass of solid rubber and is engaged in an opening of the support arm with which it co-operates by coming into abutment to limit displacement of the power unit, at least parallel to the second axis.

That known embodiment operates in satisfactory manner but suffers from the drawback that when the first finger is in abutment against the wall of the opening in the support arm, a large amount of friction is generated between the finger and the wall which impedes operation of the antivibration support in the vertical direction.

In particular, this friction tends to transmit vibratory motion directly between the power unit and the vehicle structure of the vehicle, even though the antivibration support is specifically provided to minimize such transmission as much as possible.

OBJECTS AND SUMMARY OF THE INVENTION

A particular object of the present invention is to mitigate that drawback.

To this end, according to the invention, in a motor vehicle of the kind in question, the displacement limiter further comprises:

- second and third rigid fingers each extending along a longitudinal direction parallel to the longitudinal direction of the first finger and secured to the second element, the second and third fingers lying in two planes perpendicular to the second axis and situated on opposite sides of the first finger; and
- first and second limiting rings each including a winding of thread that is strong, flexible, and substantially inextensible, embedded in an elastomer sheath, the first limiting ring being fixed to the first and second fingers with its winding of strong thread passing around the outsides of the first and second fingers taken together, and the second limiting ring being fixed to the first and third fingers with its winding of strong thread passing around the outsides of the first and third fingers taken together.

By means of these dispositions, a displacement limiter is obtained which presents relatively large stiffness parallel to the second axis, thereby effectively limiting displacements of the power unit parallel to said axis, while still presenting very low stiffness in the vertical direction.

These dispositions thus make it possible for the displacement limiter to avoid interfering with the operation of the antivibration support and thus to avoid transmitting vibratory motion between the power unit and the vehicle structure of the vehicle.

In addition, the limiting rings are highly progressive: in other words they put a limit on displacement effectively but relatively gently, without imparting any shock to the power unit.

In preferred embodiments, use may also be made, optionally, of one or more of the following dispositions:

- the first and second limiting rings constitute a single piece of elastomer reinforced with strong thread;
- the strong thread windings of the first and second limiting rings are constituted by a single continuous thread;
- each limiting ring includes rigid strength members which are embedded in its elastomer sheath and which are interposed between the winding of strong thread of said limiting ring and each of the fingers around on said limiting ring is engaged;
- each limiting ring forms two eyelets which are engaged with friction on the two fingers respectively to which said limiting ring is connected;
- each finger has a free end forming an enlarged head, the enlarged heads of the three fingers presenting the limiting rings from coming off said fingers;
- the first finger is constituted by the first strength member of the antivibration support while the second and third fingers are secured to the vehicle structure;
- the support arm extends from the power unit to an end which is fixed to the first strength member of the antivibration support, and said support arm includes an intermediate portion which is situated between the power unit and said end, and which is secured either to the first finger or else to the second and third fingers;
- the elastomer body of the antivibration support is bell-shaped, flaring from a top secured to the first strength member to an annular base secured to the second strength member, said elastomer body defining part of a working chamber which communicates via a narrow passage with a compensation chamber defined by an easily deformable wall, the working chamber, the compensation chamber, and the narrow passage forming a sealed volume that is filled with liquid; and
- the power unit has a pendulum suspension, said power unit extending longitudinally along a horizontal third axis perpendicular to the second axis and is connected to the vehicle structure by the first mount associated with the second and third mounts, the first and second mounts being substantially in alignment parallel to the third axis and being fixed to the power unit at points situated above the level of the center of gravity of said power unit, while the third mount is connected to the power unit at a point situated beneath the first and second mounts.

BRIEF DESCRIPTION OF THE DRAWINGS

Other characteristics and advantages of the invention appear from the following detailed description of various embodiments, given as non-limiting examples and with reference to the accompanying drawings.

In the drawings:

FIG. 1 is a highly diagrammatic view of the engine of a motor vehicle with pendulum suspension, known per se;

FIG. 2 is likewise highly diagrammatic showing a prior art motor vehicle fitted with an engine of the kind shown in FIG. 1, this figure showing in greater detail one of the engine mounts;

FIG. 7 is a cutaway and exploded view of a mount for an engine that is usable in a second embodiment of the invention.

MORE DETAILED DESCRIPTION

Figure 3:
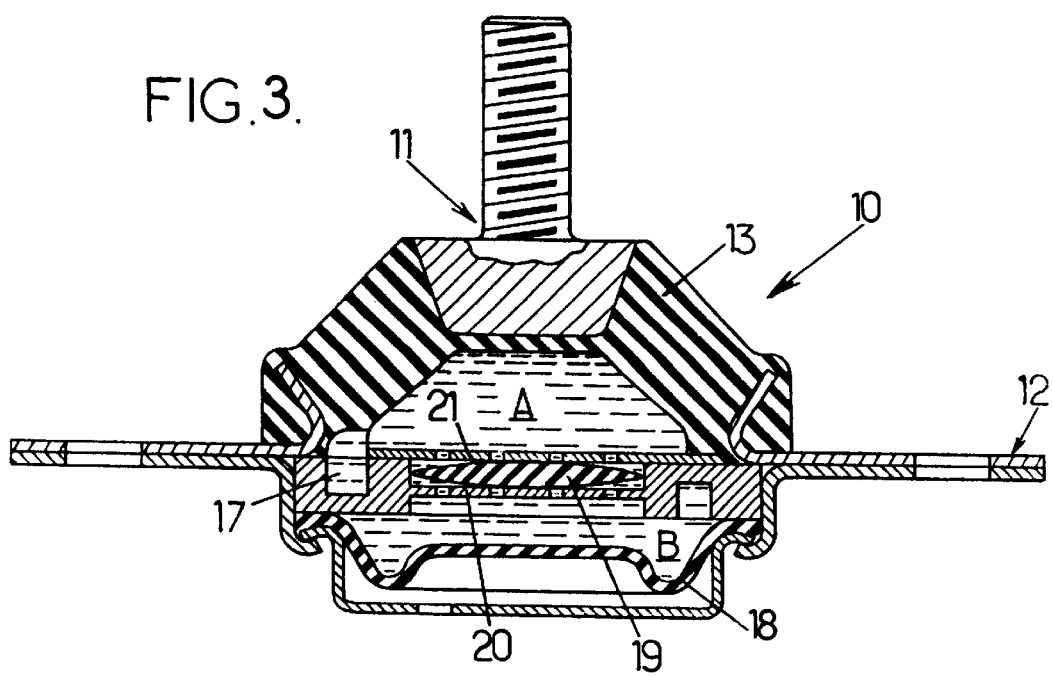
FIG. 3 is a vertical section view through a hydraulic antivibration support, of known type, belonging to the mount shown in FIG. 2.

In the various figures, the same references are used to designate elements that are identical or similar.

The invention applies preferably, but not exclusively, to a motor vehicle 1 having a power unit 2 with a pendulum suspension, of a kind that is known per se, and as shown in FIGS. 1 and 2.

In such a pendulum suspension, the longitudinal direction of the power unit 2 extends generally parallel to a transverse horizontal axis Y which is perpendicular to a horizontal axis X corresponding to the longitudinal direction of the vehicle.

Also, the power unit 2 is generally connected to the vehicle structure 3 of the vehicle via three mounts, namely:

first and second mounts 4 and 5 that are in line parallel to the axis Y and that are fixed to the longitudinal ends of the power unit at points situated above the center of gravity G of the power unit; and a third mount 6 connected to the power unit at a point situated beneath the first and second mounts, e.g. on one of the sides of the power unit or beneath said power unit.

The three mounts generally comprise respective antivibration supports each provided with an elastomer body connecting the power unit to the vehicle structure of the vehicle, in such a manner as to allow displacements of the power unit along a vertical axis Z, and along the longitudinal axis X, and to allow it to rotate about the axis Y (which gives rise to movements along the axes X and Z).

In particular, the power unit 2 rotates about the axis Y on each acceleration or deceleration.

In addition, the antivibration supports of the first and second mounts 4 and 5 are also designed, in conventional manner to support the weight of the power unit 2 and to damp vibratory motion between the power unit 2 and the vehicle structure 3 along the axis Z.

Finally, in order to limit displacement of the power unit 2, the mounts 4 to 6 include one or more displacement limiters.

Thus, in the example shown in FIG. 2 which corresponds to the prior art, the first mount 4 comprises:

a substantially horizontal rigid support arm 7 generally made of cast aluminum or of cast iron and fixed to a longitudinal end of the power unit 2, in this case the end remote from the gear box 8 of the power unit, the support arm 7 having an opening 9 passing vertically therethrough and situated in a position that is substantially halfway between the two ends of said arm 7;

an antivibration support 10 which always includes a first rigid strength member 11 fixed beneath the support arm 7, a second rigid strength member 12 fixed to the vehicle structure 3, and an elastomer body 13 interconnecting the first and second strength members and supporting the power unit 2 while allowing the above-mentioned relative displacements between the power unit and the vehicle structure; and a displacement limiter 14 which is suitable for limiting the relative displacement between the power unit 2 and the vehicle structure 3 parallel to the axis X (i.e. not only in translation along the axis X, but also in rotation about the axis Y since such rotation gives rise to displacement along the axes X and Z at all points on the power unit that do not lie on the axis of rotation).

The displacement limiter 14 comprises firstly a rigid horizontal horseshoe-shaped baseplate 15 which surrounds part of the elastomer body 13 and which is fixed to the vehicle structure 3, and secondly a rigid vertical finger 16 covered in solid rubber, which is secured to the baseplate 15 and which extends upwards from said baseplate, penetrating into the opening 9 of the support arm 7 and co-operating with the side walls of said opening by coming into abutment thereagainst.

The antivibration support 10 may be hydraulic or otherwise. In particular, the antivibration support may be of the type shown in FIG. 3, which is known from document EP-A-0 347 227, in which the elastomer body 13 is bell-shaped, flaring from a top secured to the first strength member 11 down to an annular base secured to the second strength member 12, said elastomer body defining part of a working chamber "A" which communicates via a constricted passage 17 with a compensation chamber "B" defined by an elastomer bellows 18, the working chamber "A", the compensation chamber "B", and the narrow passage 17 forming a sealed volume that is filled with liquid.

Thus, the vibratory motion between the power unit 2 and the vehicle structure 3, in particular the vibratory motion of relatively large amplitude (e.g. greater than 0.1 mm) and of relatively low frequency (e.g. less than 20 Hz) gives rise to displacements of the liquid between the chambers "A" and "B" via the narrow passage 17, thereby giving rise to particularly effective damping of said vibratory motion.

In addition, the chambers "A" and "B" are generally separated by a "decoupling" flap 19 which can be constituted, for example, by a sheet of rubber interposed between two grids 20 and 21 each in communication with a respective one of the chambers "A" and "B". The flap 19 absorbs vibration of relatively low amplitude (e.g. less than 0.1 mm) and of relatively high frequency (e.g. greater than 20 Hz) as generated by the power unit 2.

The above-described prior art mount 4 operates overall in satisfactory manner, in particular because of the remarkable effectiveness of the hydraulic anti-vibration support 10 as described above.

Nevertheless, when the finger 16 of the displacement limiter comes into abutment against the wall of the opening 9 in the support arm 7, and in particular during acceleration or deceleration of the vehicle, the large amount of friction that exists between the finger 16 and the support arm 4 allows vibratory motion to be transmitted directly between the power unit 2 and the vehicle structure 3, without being attenuated by the antivibration support 10.

Figure 4:
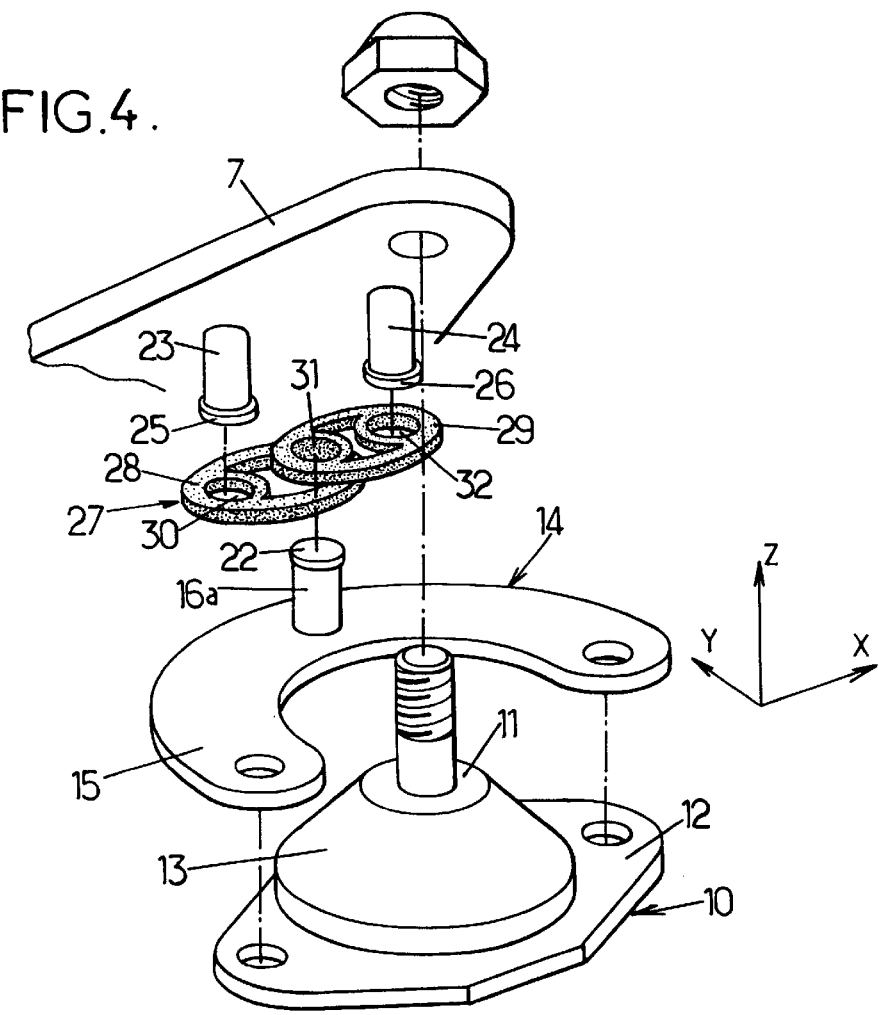
FIG. 4 is an exploded view of an engine mount constituting an embodiment of the invention and intended to replace the prior art mount as shown in FIG. 2.

To mitigate this drawback, in a first embodiment of the invention the first mount 4 is made as shown in FIG. 4, in which:

the antivibration support 10 is identical or similar to that described above;

the limiter 14 still comprises a baseplate 15 identical to that described above, but the vertical finger 16 is replaced by a vertical finger 16*a* that is shorter and that preferably has a slightly swollen head 22 at its free end;

the support arm 7 is similar to the arm described above, but it does not include the opening 9, however said arm 7 does include two vertical rigid fingers 23 and 24 which extend downwards from the bottom face of the arm 7, and each of which preferably has its free end fitted with a lightly swollen head 25, 26, with the three fingers 16*a*, 23, and 24 being disposed in the same vertical plane parallel to the axis Z, and with the free end of the finger 16*a* being situated above the free ends of the fingers 23 and 24; and the finger 16*a* is connected to the fingers 23 and 24 by a double-limiting ring 27 of elastomer constituted by first and second limiting rings 28 and 29.

Each of the two limiting rings is situated in a horizontal plane, or more generally in a plane perpendicular to the fingers 16*a*, 25, and 26.

In addition, each of these limiting rings may be generally oval in shape, extending longitudinally in the direction of the axis X between two ends each forming an eyelet that defines a respective hole 30, 31, 32, with the fingers 16*a*, 23, and 24 being engaged by force in respective ones of said holes.

Figure 5:
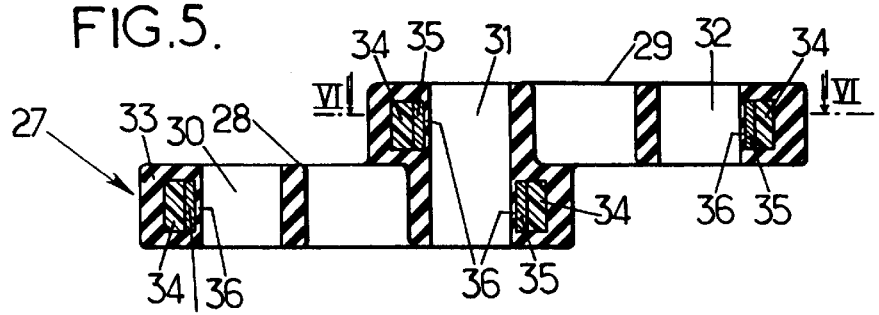
FIG. 5 is a cross-section through a double-limiting ring of elastomer belonging to the mount of FIG. 4.
Figure 6:
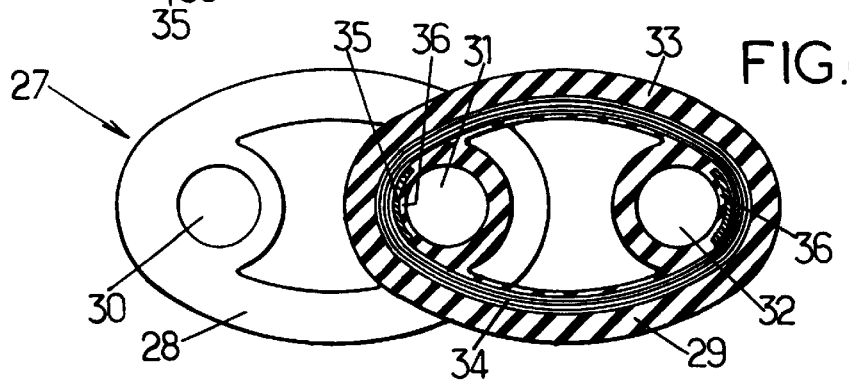
FIG. 6 is a section view on line VI—VI of FIG. 5.

As shown in greater detail in FIGS. 5 and 6, the double-limiting ring 27 comprises a single elastomer body 33 which is common to the first and second limiting rings 28 and 29.

However, the two limiting rings 28 and 29 could be separate pieces without going beyond the ambit of the invention.

In addition, the double limiting ring 27 is reinforced by a winding 34 of thread that is flexible and substantially inextensible (i.e. that is less extensible than rubber), e.g. a polyester thread.

The winding 34 constitutes two loops of thread, i.e. a first loop inside the first limiting ring 28 passing around the outsides of the fingers 16*a* and 23, and a second loop lying inside the second limiting ring 29 and passing round the outsides of the fingers 16*a* and 24.

By way of example, each loop may have about 40 turns of thread, using the most commonly used polyester threads.

The two thread loops are preferably made using a single continuous polyester thread.

Optionally, a rigid strength member 35 made of metal or of plastics material may be interposed between the thread winding 34 and each of the fingers 16*a*, 23, and 24, thereby enabling forces to be properly distributed between the thread winding 34 and the elastomer body 33.

In all cases, the elastomer body 33 has portions 36 interposed between the strength members 35 and the fingers 16*a*, 23, and 24 in order to ensure that limitation is applied progressively to the displacements of the power unit, i.e. in order to prevent the power unit being subjected to violent shocks when its displacements are subjected to limitation.

Also, in the situation considered herein, the oval shape of the two limiting rings 28 and 29 also participates in achieving progressive limiting of the displacements.

The double limiting ring 27 makes it possible to limit displacements of the power unit parallel to the axis X (i.e. both in translation along the axis Y and in rotation about the axis Y since such rotation causes the power unit to move specifically along the axis X) with relatively high elastic stiffness, while the double limiting ring presents low elastic stiffness parallel to the axis Z, thereby enabling it to avoid interfering with the operation of the antivibration support.

In particular, when the support arm 7 is subjected to a force parallel to the axis X and lying in the range 500 Newtons (N) to 2000 N, the overall mount 4 presents a small ratio between its overall elastic stiffness Kz parallel to the axis Z and its overall elastic stiffness Kx parallel to the axis X, said ratio generally lying in the range 0.1 to 0.15, depending on the applied force, thus constituting an excellent value which is considerably smaller than the values obtained using prior art mounts such as that shown in FIG. 2 where the ratio Kz/Kx was about 0.2.

In a variant, as shown in FIG. 7, the support fingers 16*b*, 23*a*, and 24*a* which are engaged in the respective holes 30, 31, and 32 of the double limiting ring 27 can extend along the axis Y, in which case the two limiting rings 28 and 29 lie in respective vertical planes parallel to the axis X.

In addition, the three fingers are not necessarily in alignment, providing the two fingers secured to the support 7 are in alignment parallel to the axis X and lie in respective planes perpendicular to the axis X and disposed on either side of the finger secured to the vehicle structure 3 of the vehicle.

Under such circumstances, and as shown in FIG. 7, the two rings 28 and 29 of the double limiting ring 27 extend in longitudinal directions that are not parallel, generally making an angle between each other that is greater than 90°.

Finally, the three fingers to which the double-limiting ring 27 is connected could form portions of parts other than those described above, providing one of the fingers is secured directly or indirectly to one of the arms 7 and the vehicle structure 3, while the other two fingers on either side of the first finger are secured to the other of the arm 7 and the vehicle structure 3.

For example, as shown in FIG. 7, one of the fingers supporting the double-limiting ring 27 could be constituted by the first strength member 11 of the anti-vibration support 10, this strength member 11 then preferably having an annular groove which receives the common ends of the two limiting rings 28 and 29.

Under such circumstances, the other two fingers about which the first and second limiting rings 28 and 29 pass respectively can be constituted by two rigid vertical fingers 37 and 38 secured to the second strength member 12 of the antivibration support 10.

Figure 8:
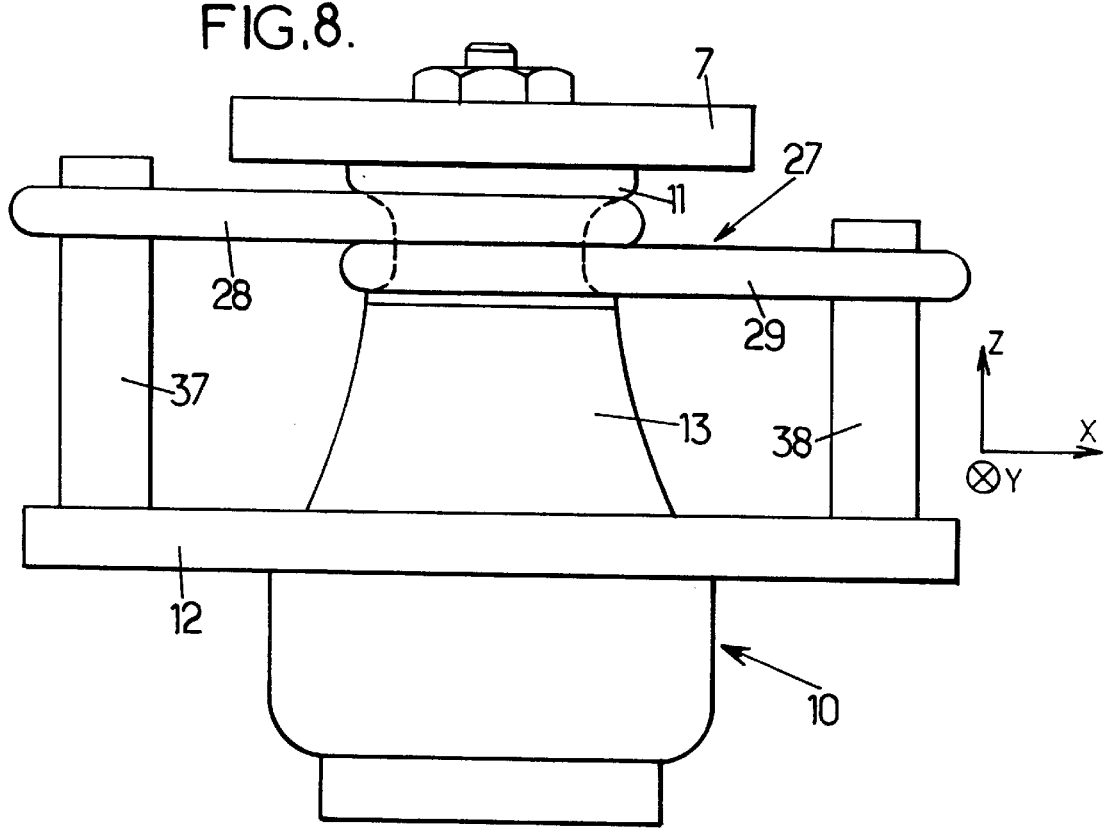
FIG. 8 is a diagrammatic view of a mount for an engine in yet another embodiment of the invention.

Also, in the embodiment of FIG. 8, as in the other embodiments, the limiting rings 28 and 29 need have only one eyelet at their common end, or may possibly have no eyelets at all defining holes through which there pass fingers supporting the limiting rings: under such circumstances, it is preferable for each limiting ring 28 and 29 to be prestressed in permanent traction between the two fingers it engages.

We claim:

1. A motor vehicle comprising a vehicle structure, a power unit, and a plurality of mounts supporting the power unit and damping relative vibratory motion between the power unit and the vehicle structure parallel to a substantially vertical first axis, said mounts allowing displacements of the power unit relative to the vehicle structure parallel to the first axis and at least parallel to a second axis perpendicular to the first axis, at least one of said mounts, referred to as the "first mount" comprising:

a rigid support arm secured to the power unit, one of the support arm and the vehicle structure being referred to below as the "first element" and the other being referred to as the "second element";

an antivibration support itself comprising a first rigid strength member fixed to the support arm, a second rigid strength member fixed to the vehicle structure, and an elastomer body interconnecting the first and second strength members and supporting the power unit while allowing the above-mentioned relative displacements to take place between the power unit and the vehicle structure; and a displacement limiter suitable for limiting relative displacements between the power unit and the vehicle structure parallel to the second axis, the displacement limiter comprising a rigid first finger which extends along a direction perpendicular to the second axis and which is secured to the first element;

wherein the displacement limiter further comprises:

second and third rigid fingers each extending along a longitudinal direction parallel to the longitudinal direction of the first finger and secured to the second element, the second and third fingers lying in two planes perpendicular to the second axis and situated on opposite sides of the first finger; and first and second limiting rings each including a winding of thread that is strong, flexible, and substantially inextensible, embedded in an elastomer sheath, the first limiting ring being fixed to the first and second fingers with its winding of strong thread passing around the outsides of the first and second fingers taken together, and the second limiting ring being fixed to the first and third fingers with its winding of strong thread passing around the outsides of the first and third fingers taken together.

2. A vehicle according to claim 1, in which the first and second limiting rings constitute a single piece of elastomer reinforced with strong thread.

3. A vehicle according to claim 2, in which the strong thread windings of the first and second limiting rings are constituted by a single continuous thread.

4. A motor vehicle according to claim 1, in which each limiting ring includes rigid strength members which are embedded in its elastomer sheath and which are interposed between the winding of strong thread of said limiting ring and each of the fingers around on said limiting ring is engaged.

5. A vehicle according to claim 1, in which each limiting ring forms two eyelets which are engaged with friction on the two fingers respectively to which said limiting ring is connected.

6. A vehicle according to claim 5, in which each finger has a free end forming an enlarged head, the enlarged heads of the three fingers presenting the limiting rings from coming off said fingers.

7. A vehicle according to claim 1, in which the first finger is constituted by the first strength member of the antivibration support while the second and third fingers are secured to the vehicle structure.

8. A vehicle according to claim 1, in which the support arm extends from the power unit to an end which is fixed to the first strength member of the antivibration support, and said support arm includes an intermediate portion which is situated between the power unit and said end, and which is secured either to the first finger or else to the second and third fingers.

9. A vehicle according to claim 1, in which the elastomer body of the antivibration support is bell-shaped, flaring from a top secured to the first strength member to an annular base secured to the second strength member, said elastomer body defining part of a working chamber which communicates via a narrow passage with a compensation chamber defined by an easily deformable wall, the working chamber, the compensation chamber, and the narrow passage forming a sealed volume that is filled with liquid.

10. A vehicle according to claim 1, in which the power unit has a pendulum suspension, said power unit extending longitudinally along a horizontal third axis perpendicular to the second axis and is connected to the vehicle structure by the first mount associated with the second and third mounts, the first and second mounts being substantially in alignment parallel to the third axis and being fixed to the power unit at points situated above the level of the center of gravity of said power unit, while the third mount is connected to the power unit at a point situated beneath the first and second mounts.

* * * * *